United States Patent
Chen et al.

(10) Patent No.: US 6,563,977 B1
(45) Date of Patent: May 13, 2003

(54) COMPACT WAVELENGTH MULTIPLEXER-DEMULTIPLEXER PROVIDING LOW POLARIZATION SENSITIVITY

(75) Inventors: Li Chen, Fremont, CA (US); Shu Zhang, Fremont, CA (US); Wei Yang, Fremont, CA (US)

(73) Assignee: Bayspec, Inc., Fremont, CA (US)

( * ) Notice: Subject to any disclaimer, the term of this patent is extended or adjusted under 35 U.S.C. 154(b) by 66 days.

(21) Appl. No.: 09/605,523

(22) Filed: Jun. 27, 2000

(51) Int. Cl.$^7$ .............................. G02B 6/28; H04J 14/06
(52) U.S. Cl. .............................. 385/24; 385/31; 385/33; 359/115; 359/122
(58) Field of Search .............................. 385/15, 11, 24, 385/27, 31, 33; 359/115, 127, 131, 122

(56) References Cited

U.S. PATENT DOCUMENTS

| | | | |
|---|---|---|---|
| 4,111,524 A | 9/1978 | Tomlinson, III | 350/96.19 |
| 4,153,330 A | 5/1979 | Tomlinson, III | 350/96.17 |
| 4,198,117 A | 4/1980 | Kobayashi | 350/96.19 |
| 4,274,706 A | 6/1981 | Tangonan | 350/96.19 |
| 4,299,488 A | 11/1981 | Tomlinson, III | 356/328 |
| 4,359,259 A | 11/1982 | Horner et al. | 350/3.7 |
| 4,387,955 A | 6/1983 | Ludman et al. | 350/96.19 |
| 4,522,462 A | 6/1985 | Schnell | 350/96.19 |
| 4,583,820 A | 4/1986 | Flamand et al. | 350/96.19 |

(List continued on next page.)

OTHER PUBLICATIONS

Tomlinson, W.J., "Wavelength Multiplexing In Multimode Optical Fibers", *Applied Optics*, vol. 16, No. 8, pp. 2180–2194 (Aug. 1977).

Chang, B.J. et al., "Dichromated Gelatin For The Fabrication of Holographic Optical Element", *Applied Optics*, vol. 18, pp. 2407–2417 (1979).

Aoyama, K. et al. "Low–Loss Optical Demultiplexer For WDM Systems In The 0.8 $\mu$m Wavelength Region" *Applied Optics*, vol. 18, pp. 2407–1417 (1979).

Ishii Y. et al., "Wavelength Demultiplexer In Multimode Fiber That Uses Optimized Holographic Elements", *Applied Optics*, vol. 32, No. 23, pp. 4415–4422 (1993).

(List continued on next page.)

*Primary Examiner*—Rodney Bovernick
*Assistant Examiner*—Juliana K. Kang
(74) *Attorney, Agent, or Firm*—Justin Boyce; Oppenheimer Wolff & Donnelly LLP

(57) ABSTRACT

An optical multiplexing and demultiplexing device includes: a fiber mounting means for securing a plurality of optical fibers each terminating in a fiber end, at least one of the fiber ends radiating a corresponding input beam having a polarization state defined by a polarization plane that may vary as a function of time, and at least one of the fiber ends for receiving an output beam; collimating and focusing means having a focal length, and providing collimation of the input beams, and focusing of the output beams; diffraction means including at least one diffractive element providing for dispersion of optical beams passing therethrough, each diffractive element having an associated diffraction efficiency that varies as a function of the polarization state of light beams passing therethrough; and a polarization rotating means for rotating the plane of polarization of a beam passing therethrough by a specified number of degrees. The device provides for a particular input beam having a first polarization state to be diffracted by the diffractive elements in accordance with a first diffraction efficiency based on the first polarization state. The beam is then passed through the polarization rotating means at least once and thereby rotated into a second polarization state. The rotated beam is then diffracted by at least one of the diffractive elements in accordance with a second diffraction efficiency based on the second polarization state, whereby the device provides a spectral resolution that is substantially insensitive to variations in the polarization state of the input beam.

18 Claims, 9 Drawing Sheets

U.S. PATENT DOCUMENTS

| | | | | |
|---|---|---|---|---|
| 4,622,662 | A | 11/1986 | Laude et al. | 370/3 |
| 4,634,215 | A | 1/1987 | Reule | 350/96.19 |
| 4,643,519 | A | 2/1987 | Bussard et al. | 350/96.19 |
| 4,671,607 | A | 6/1987 | Laude | 350/96.15 |
| 4,675,860 | A | 6/1987 | Laude et al. | 370/3 |
| 4,703,472 | A | 10/1987 | Blumentritt et al. | 370/3 |
| 4,708,425 | A | 11/1987 | Gouali et al. | 350/96.16 |
| 4,726,645 | A | 2/1988 | Yamashita et al. | 350/96.18 |
| 4,740,951 | A | 4/1988 | Lizet et al. | 370/3 |
| 4,741,588 | A | 5/1988 | Nicia et al. | 350/96.19 |
| 4,744,618 | A | 5/1988 | Mahlein | 350/96.19 |
| 4,746,186 | A | 5/1988 | Nicia | 350/96.13 |
| 4,763,969 | A | 8/1988 | Khoe et al. | 350/96.19 |
| 4,773,063 | A | 9/1988 | Hunsperger et al. | 370/3 |
| 4,786,133 | A | 11/1988 | Gidon et al. | 350/96.19 |
| 4,819,224 | A | 4/1989 | Laude et al. | 370/3 |
| 4,819,244 | A | 4/1989 | Yamamoto et al. | 372/46 |
| 4,836,634 | A | 6/1989 | Laude | 350/96.19 |
| 4,923,271 | A | 5/1990 | Henry et al. | 350/96.19 |
| 4,926,412 | A | 5/1990 | Jannson et al. | 370/3 |
| 4,930,855 | A | 6/1990 | Clark et al. | 350/96.19 |
| 5,026,131 | A | 6/1991 | Jannson et al. | 350/3.7 |
| 5,107,359 | A | 4/1992 | Ohuchida | 359/124 |
| 5,119,454 | A | 6/1992 | McMahon | 385/49 |
| 5,355,237 | A | 10/1994 | Lang et al. | 359/130 |
| 5,363,220 | A | 11/1994 | Kuwayama et al. | 359/3 |
| 5,371,813 | A | 12/1994 | Aartgue | 385/24 |
| 5,440,416 | A | 8/1995 | Cohen et al. | 359/127 |
| 5,442,472 | A | 8/1995 | Skrobko | 359/110 |
| 5,450,510 | A | 9/1995 | Boord et al. | 385/37 |
| 5,457,573 | A | 10/1995 | Iida et al. | 359/569 |
| 5,500,910 | A | 3/1996 | Boudreau et al. | 385/24 |
| 5,526,155 | A | 6/1996 | Knox et al. | 359/130 |
| 5,555,334 | A | 9/1996 | Ohnishi et al. | 385/93 |
| 5,583,683 | A | 12/1996 | Scobey | 359/127 |
| 5,768,450 | A | 6/1998 | Bhagavatula | 385/24 |
| 5,777,763 | A | 7/1998 | Tomlinson, III | 359/130 |
| 5,835,517 | A | 11/1998 | Jayaraman et al. | 372/50 |
| 6,097,863 | A * | 8/2000 | Chowdhury | 385/37 |
| 6,204,946 | B1 * | 3/2001 | Aksyuk et al. | 359/131 |
| 6,301,030 | B1 * | 10/2001 | Robinson | 359/122 |
| 6,304,692 | B1 * | 10/2001 | Sappey et al. | 385/24 |
| 6,330,090 | B1 * | 12/2001 | Martin et al. | 359/131 |
| 6,337,935 | B1 * | 1/2002 | Ford et al. | 385/24 |

OTHER PUBLICATIONS

Moslehi, et al., "Fiber–Optic Wavelength–Division Multiplexing And Demultiplexing Using Volume Holographic Gratings", *Optics Letters*, vol. 14, No. 19, pp. 1088–1090 (Oct. 1989).

Aoyama, K., et al., "Optical Demultiplexer For a Wavelength Division Multiplexing System", *Applied Optics*, vol. 18, No. 8, pp. 1253–1258 (Apr. 15, 1979).

Tomlinson, W.J., "Applications of GRIN–Rod Lenses In Optical Fiber Communication Systems", *Applied Optics*, vol. 19, No. 7, pp. 1127–1138 (Apr. 1, 1980).

Metcalf, B.D., et al., "High–Capacity Wavelength Demultiplexer With a Large–Diameter GRIN Rod Lens", *Applied Optics.*, vol. 21, No. 5, pp. 794–796 (Mar. 1, 1982).

Lipson, J., et al., "Low–Loss Wavelength Division Multiplexing (WDM) Devices For Single–Mode Systems", *Journal of Lightwave Technology*, vol. LT–1, No. 2, pp. 387–389 (Jun. 1983).

Winzer, G., "Wavelength Multiplexing Components—A Review Of Single–Mode Devices And Their Applications", *Journal of Lightwave Technology*, vol. LT–2, No. 4, pp. 369–378 (Aug. 1984).

Fujii, Y., et al., "Optical Demultiplexer Utilizing An Ebert Mounting Silicon Grating", *Journal of Lightwave Technology*.

Fujii, Y., et al., "Optical Demultiplexer Utilizing An Ebert Mounting Silicon Grating", *Journal of Lightwave Technology*, vol. LT–2, No. 5, pp. 731–734 (Oct. 1984).

Ishio, H., et al., "Review And Status Of Wavelength–Division–Multiplexing Technology And Its Application", *Journal of Lightwave Technology*, vol. LT–2, No. 4, pp. 448–463 (Aug. 1984).

Lipson, J., et al., "A Four–Channel Lightwave Subsystem Using Wavelength Division Multiplexing", *IEEE Journal of Lightwave Technology*, vol. LT–3, No. 1, pp. 16–20 (Feb. 1985).

Hillerich, B., et al., "Wide Passband Grating Multiplexer For Multimode Fibers", *Journal of Lightwave Technology*, vol. LT–3, No. 3, pp. 590–594 (Jun. 1985).

Lipson, J., et al., "A Six–Channel Wavelength Multiplexer And Demultiplexer For Single Modoe Systems", *Journal of Lightwave Technology*, vol. LT–3, No. 5, pp. 1159–1163 (Oct. 1985).

Nishi, I., et al. "Broad Passband Multi/Demultiplexer For Multimode Fibers Using A Diffraction Grating And Retroreflectors", *Journal Of Lightwave Technology*, vol. LT–5, No. 12, pp. 1695–1700 (Dec. 1987).

Huang, Y., et al., "Wavelength–Division–Multiplexing And –Demultiplexing Using Substrate–Mode Grating Pairs", *Optics Letters,*, vol. 17, No. 22, pp. 1629–1631 (Nov. 15, 1992).

Wu, M., et al., "Design Considerations For Rowland Circle Gratings Used In Photonic Integrated Devices For WDM Applications", *Journal of Lightwave Technology*, vol. 12, No. 11, pp. 1939–1942 (Nov. 1994).

Wang, M., et al., "Five–Channel Polymer Waveguide Wavelength Division Demultiplexer For The New Infrared", *IEEE Photonics Technology Letters*, vol. 3, No. 1, pp. 36–38 (Jan. 1991).

* cited by examiner

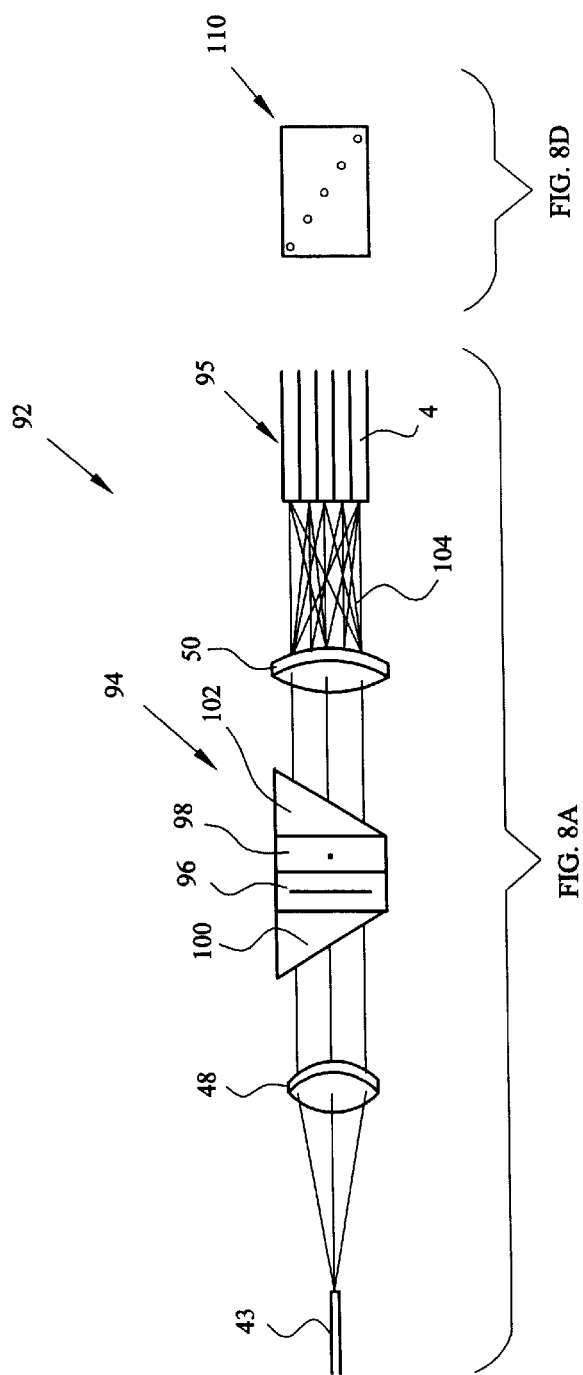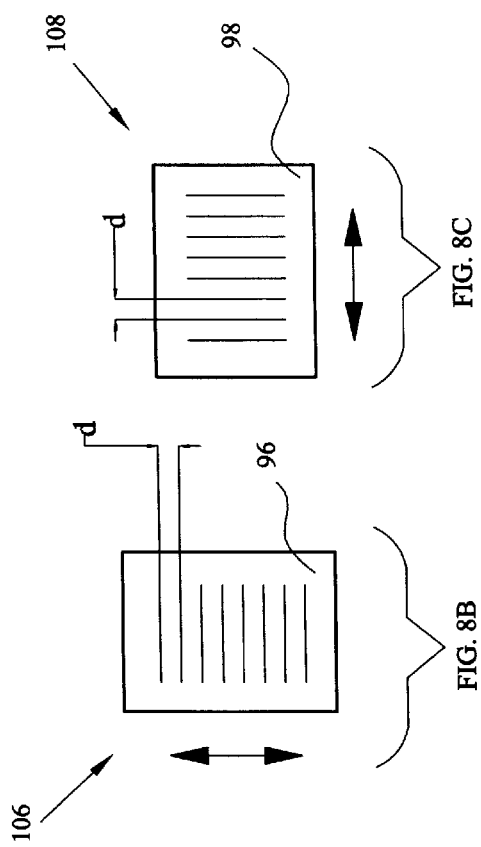

COMPACT WAVELENGTH MULTIPLEXER-DEMULTIPLEXER PROVIDING LOW POLARIZATION SENSITIVITY

BACKGROUND OF THE INVENTION

1. Field of the Invention

The present invention relates generally to a method and apparatus for optical multiplexing and demultiplexing, and more particularly to a compact wavelength optical multiplexer-demultiplexer device providing high spectral resolution and low polarization dependency.

2. Description of the Prior Art

The explosive growth of telecommunication and computer communications, especially in the area of the Internet, has created a dramatic in increase in the volume of worldwide data traffic which has placed an increasing demand for communication networks providing increased bandwidth. To meet this demand, fiber optic (light wave) communication systems have been developed in order to harness the enormous usable bandwidth (tens of tera-Hertz) of a single optical fiber transmission link. Because it is not possible to exploit all of the bandwidth of an optical fiber using a single high capacity channel, wavelength division-multiplexing (WDM) fiber optic systems have been developed to provide transmission of multi-carrier signals over a single optical fiber thereby channelizing the bandwidth of the fiber. In accordance with WDM technology, a plurality of superimposed concurrent signals are transmitted on a single fiber, each signal having a different wavelength. WDM technology takes advantage of the relative ease of signal manipulation in the wavelength, or optical frequency domain, as opposed to the time domain. In WDM networks, optical transmitters and receivers are tuned to transmit and receive on a specific wavelength, and many signals operating on distinct wavelengths share a single fiber.

Wavelength multiplexing devices are commonly used in fiber optic communication systems to generate a single multi-carrier signal, in response to a plurality of concurrent signals having different wavelengths received from associated sources or channels, for transmission via a single fiber. At the receiving end, wavelength demultiplexing devices are commonly used to separate the composite wavelength signal into the several original signals having different wavelengths.

Dense wavelength division multiplexing (DWDM) devices provide multiplexing and demultiplexing functions in specific wavelength ranges. Important design criteria for a DWDM device include a large number of channels, narrow channel spacing, low inter-channel cross talk, low insertion loss, low polarization dependency, compactness, environmental stability, and low manufacturing cost.

U.S. patent application Ser. No. 09/193,289, filed Nov. 17, 1998, entitled "COMPACT DOUBLE-PASS WAVELENGTH MULTIPLEXER-DEMULTIPLEXER" and U.S. patent application Ser. No. 09/362,926, filed Jul. 27, 1999, entitled "COMPACT DOUBLE-PASS WAVELENGTH MULTIPLEXER HAVING AN INCREASED NUMBER OF CHANNELS" have at least one inventor in common with the present application, and are hereby incorporated by reference. Each of these Patent Applications describes a multiplexer/demultiplexer device including: a fiber mounting assembly for aligning an array of optical fibers for transmitting optical signals; collimating and focusing optics (e.g., a lens) for collimating and focusing optical beams; a transmission grating having a diffractive element that provides diffraction of optical beams; and a reflective element such as a mirror. The fiber mounting assembly supports a plurality of close-spaced optical fibers such that ends of the fibers are disposed substantially in a common plane. The collimating and focusing optics, transmission grating, and mirror are designed to provide efficient operation in selected communication wavelength regions.

During operation of one these devices as a demultiplexer, an input optical beam including a plurality of individual wavelengths is transmitted to the device via an input one of the optical fibers, and radiated from the end of the input fiber which is located at the vicinity of a focal point of the collimating lens. Divergence of the radiated input beam depends on the numerical aperture of the input fiber. The lens has a sufficient numerical aperture to accept the diverging beam from the input fiber and substantially collimate the beam which is then passed through the diffractive element causing the wavelengths of the input beam to be diffracted and separated according to their wavelengths. The spatially separated beams are redirected by the mirror back to the diffractive element which provides further spatial separation of the individual wavelengths, thereby enhancing the total dispersion effect. The spatially separated beams are then focused by the focusing lens and received directly by a plurality of output ones of the optical fibers.

During operation of the device as a multiplexer, the beam directions are essentially reversed as compared to the beam directions during operation in the demultiplexer mode. In this embodiment, each of the optical beams provided by the fibers has a different wavelength. The wavelengths of each of the beams are collimated by the lens, and then diffracted by the diffractive element with specific angular orientations according to the specific wavelength of the individual beam. The diffracted beams are reflected by the mirror, diffracted again by the diffractive element, and eventually merged into a substantially collimated beam including all of the wavelengths. This collimated beam is then focused by the lens onto an output one of the optical fibers.

Each of the devices described in U.S. patent application Ser. No. 09/193,292 and U.S. patent application Ser. No. 09/362,926 satisfies most of the important design criteria for operation of the device as a dense wavelength division multiplexer (DWDM) device. However, these devices have certain limitations which pose a difficulty in minimizing the physical size of the device while maximizing the transmission capacity.

In order to increase the transmission capacity of a fiber communication network using a DWDM device of the type described above, it is possible to increase the number of channels by decreasing the channel wavelength spacing while maintaining the physical spacing between the optical fibers in the array. The number of channels provided by a device is proportional to the linear dispersion provided by the device. The linear dispersion of a wavelength separation device of the type described above can be expressed generally in accordance with relationship (1), below.

$$\delta L/\delta\lambda = f \cdot (\delta L/\delta\theta) = (f \cdot m)/(d \cdot \cos\theta) \qquad (1)$$

Where $\delta L/\delta\theta$ represents linear dispersion provided by the device, f is the focal length of the collimating and focusing element, and d is the groove spacing of the diffractive element of the grating. Note that the groove spacing d of the diffractive element is inversely proportional to the groove density of the diffractive element.

Relationship (1) suggests two obvious methods of increasing the number of channels in a DWDM device.

These methods include: increasing the focal length f of the collimating and focusing element; and increasing the groove density of the diffractive element of the grating. However, these methods of increasing the number of channels in the device are complicated by the fact that modern optical networks demand smaller and smaller physical device sizes while also requiring high optical performances as further explained below.

The first method of increasing the number of channels of the DWDM device includes increasing the focal lens f of the device, thereby increasing the spectral resolution of the device and reducing the channel spectral spacing between adjacent fibers. However, a consequence of increasing the focal lens f of the device is that the over-all physical size of the device will be increased. Increasing the size of the device leads to increased costs of production, and also makes environmental responses (e.g., thermal responses, stress responses, etc.) of the mechanical and optical assembly of the device difficult to control.

The second method of increasing the number of channels includes increasing the grating groove density (thereby reducing the groove spacing d) in order to provide higher dispersion and thus higher spectral resolution. It is possible to reduce the focal length f of the optical device while increasing the groove density in order to minimize the size of the device and still maintain, or even increase the spectral resolution. Maintaining the focal length of the optical element of the device while increasing the groove density of the grating allows for a smaller size device and increased dispersion. However, increasing the groove density of the grating requires an increase in the optimal grating incidence angle. The grating incidence angle of a beam incident on the grating (diffractive element) is defined by the angular difference between the propagation direction of the beam and a vector that is normal to the surface of the grating. A problem of increased polarization sensitivity arises in increasing the groove density of the grating, and increasing the optimal grating incidence angle.

Polarization sensitivity refers to the variation in the spectral resolution of a device as a function of variations in the polarization state of optical beams input to the device. Polarization sensitivity in a multiplexer-demultiplexer device is caused by variations in the diffraction efficiency of the grating of the device as a function of variations in the plane of polarization of an input beam with respect to the orientation of the diffractive element which is defined by the groove distribution direction of the diffractive element. As the groove density of the diffractive element of the grating is increased, and the optimal grating incidence angle is increased, the diffraction efficiency of the grating of the device becomes more dependent on variations in the polarization state of incoming beams which leads to an increase in the overall device polarization sensitivity.

It may be possible to fine tune the grating incidence angle during fabrication of the grating assembly so that the grating efficiencies are similar for both S-polarization and P-polarization light incident on the grating. However, by fine tuning the grating incidence angle in this manner, the absolute value of the grating efficiency is significantly reduced causing the device to have a high insertion loss which is undesirable for a wavelength multiplexer/demultiplexer device.

Minimal polarization sensitivity is an important design parameter for multiplexer demultiplexer devices to be used in optical communication networks because the polarization state of beams transmitted via the network can vary over time due to a wide variety of optical effects in the network, and it is essential that the performance of a multiplexer-demultiplexer device does not vary with the polarization state of beams transmitted thereto. Therefore, what is needed is a compact wavelength multiplexer-demultiplexer device that provides increased spatial resolution while also providing minimal polarization sensitivity,

SUMMARY OF THE INVENTION

It is therefore an object of the present invention to provide a dense wavelength division multiplexing (DWDM) device having an increased number of channels and low polarization sensitivity.

It is also an object of the present invention to provide a DWDM device that accommodates large transmission capacity while being small, lightweight, immune to temperature variation and stress-induced instability, and inexpensive to produce.

Another important object of the present invention is to provide DWDM device that is easy to manufacture in large quantities using components that are easy to make and assemble.

Briefly, a presently preferred embodiment of the present invention provides an optical multiplexing and demultiplexing device including: fiber mounting means for securing a plurality of optical fibers each terminating in a fiber end, at least one of the fiber ends radiating a corresponding input beam having a polarization state defined by a polarization plane that may vary as a function of time, and at least one of the fiber ends for receiving an output beam; collimating and focusing means having a focal length, and providing collimation of the input beams, and focusing of the output beams; diffraction means including at least one diffractive element providing for dispersion of optical beams passing therethrough, each diffractive element having an associated diffraction efficiency that varies as a function of the polarization state of light beams passing therethrough; and a polarization rotating means for rotating the plane of polarization of a beam passing therethrough by a specified number of degrees.

The device provides for a particular input beam having a first polarization state to be diffracted by the diffractive elements in accordance with a first diffraction efficiency based on the first polarization state. The beam is then passed through the polarization rotating means at least once and thereby rotated into a second polarization state. The rotated beam is then diffracted by at least one of the diffractive elements in accordance with a second diffraction efficiency based on the second polarization state, whereby the device provides a spectral resolution that is substantially insensitive to variations in the polarization state of the input beam.

In one embodiment, the device further includes a reflective element, and the polarization rotating means is disposed between the reflective element and the diffraction means. Also in this embodiment, the diffraction means includes a transmissive diffractive element. This embodiment of the device provides for a particular input beam having a first polarization state to be transmissively diffracted a first time by the diffraction means in accordance with a first diffraction efficiency based on the first polarization state, passed through the polarization rotating means a first time, reflected by the reflective element back to the polarization rotating means, passed through the polarization rotating means a second time and thereby rotated into a second polarization state, and transmissively diffracted a second time by the diffraction means in accordance with a second diffraction efficiency based on the second polarization state.

In one embodiment, the polarization rotating means includes a magnetic-optic crystal. The magnetic strength and thickness of the crystal may be selected to provide a selected rotation of the plane of polarization of beams passing therethrough. In one embodiment, the polarization rotating means provides for rotating the plane of polarization of a beam passing once therethrough by approximately 45 degrees.

In another embodiment, the collimating and focusing means includes an off-axis parabolic mirror. This embodiment of the device may be formed using individual parts or may be formed as an integral unit. In an embodiment wherein the device is formed as an integral unit, a chamber means is formed, the chamber having a first wall forming a parabolic surface at least a portion of which is polished to provide the off-axis parabolic mirror, and a second wall having a planar surface at least a portion of which is polished to provide the reflective element. In one embodiment, the polarization rotating means is formed by a crystal having at least one planar surface, and the planar surface of the crystal is contiguous with the polished portion of the second wall.

A single grating pass embodiment of the device includes: first and second fiber mounting assemblies forming the fiber mounting means, the first fiber mounting assembly for securing a single optical fiber terminating in a fiber end, the second fiber mounting assembly for securing an array of secondary optical fibers each terminating in a fiber end; a first lens and a second lens providing the collimating and focusing means, the first lens for focusing and collimating beams propagating between the ends of the single fiber and the diffraction means, the second lens for focusing and collimating beams propagating between the ends of the array of optical fibers and the diffraction means; a first reflective element for reflecting beams radiating to and from the single fiber via the diffraction means, and for reflecting beams radiating to and from the polarization rotating means; and a second reflective element for reflecting beams radiating to and from the array of optical fibers via the diffraction means, and for reflecting beams radiating to and from the polarization rotating means. In this embodiment, the polarization rotating means includes a single optical active crystal designed to provide for rotating the plane of polarization of a beam passing once therethrough by approximately 90 degrees. This embodiment of the device may also be formed as an integral unit including means forming a chamber having a first wall at least a portion of which is polished to provide the first reflective surface, and a second wall having a planar surface at least a portion of which is polished to provide the second reflective surface.

Another single grating pass embodiment of the device includes: first and second fiber mounting assemblies forming the fiber mounting means, the first fiber mounting assembly for securing a single optical fiber terminating in a fiber end, the second fiber mounting assembly for securing an array of secondary optical fibers each terminating in a fiber end; first and second transmissive diffractive elements forming the diffraction means, the polarization rotating means being disposed between the first and second diffractive elements; and a first lens and a second lens providing the collimating and focusing means, the first lens for focusing and collimating beams propagating between the end of the single fiber and the first diffractive element, the second lens for focusing and collimating beams propagating between the ends of the array of optical fibers and the second diffractive element. During operation of this device in a demultiplexing mode, a particular input beam having a first polarization state is transmissively diffracted a first time by the first diffractive element in accordance with a first diffraction efficiency based on the first polarization state, passed through the polarization rotating means and thereby rotated into a second polarization state, transmissively diffracted a second time by the second diffractive element in accordance with a second diffraction efficiency based on the second polarization state, and focused by the second lens.

In yet another embodiment of the device of the present invention, the diffraction means and the polarization rotating means are both provided by a dual grating assembly including a first diffractive element having a first grating orientation defined by a first groove distribution direction, and a second diffractive element having a second grating orientation defined by a second groove distribution direction, the first and second groove distribution directions being substantially orthogonal to each other. The first and second diffractive elements are substantially identical, each having a substantially equal groove density and providing a substantially equal diffraction efficiency for incident beams having a plane of polarization that is oriented at the same angle relative to the groove distribution direction of the diffractive element. However, the diffraction efficiency provided by each of the first and second diffractive elements varies as a function of the orientation of the plane of polarization of incident beams relative to the groove distribution direction of the diffractive element. However, because the first and second diffractive elements are oriented so that the first and second groove distribution directions are substantially orthogonal, a beam passing through both the first and second diffractive elements is diffracted in accordance with a total diffraction efficiency that is independent of the polarization state of the incident beam, that is the orientation of the plane of polarization of the incident beam.

An important advantage of the device of the present invention is that it is substantially insensitive to variations in the plane of polarization of incoming optical signals.

Other advantages of a device of the present invention include small size, light weight, and immunity to environmental stress.

The forgoing and other objects, features, and advantages of the present invention will be apparent from the following detailed description of the preferred embodiment which makes reference to the several figures of the drawing.

IN THE DRAWINGS

Figure 9:
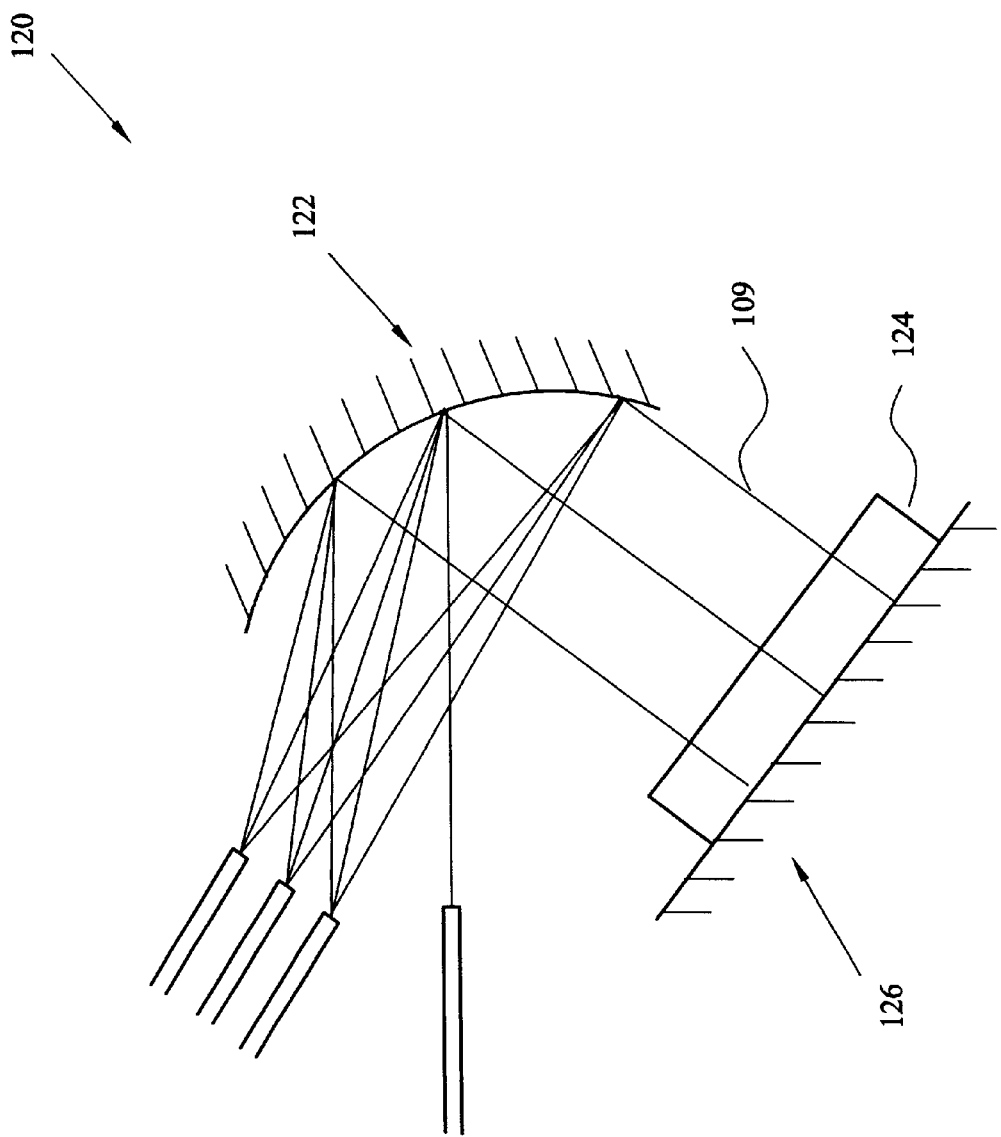

FIGS. 8A through 8D are block diagrams illustrating another embodiment of a device having low polarization sensitivity in accordance with the present invention, the depicted device including a pair of diffractive elements, each having a grating orientation that is substantially orthogonal to the other; and FIG. 9 is a block diagram illustrating yet another embodiment of a device in accordance with the present invention, the device having a concave reflective grating.

DETAILED DESCRIPTION OF THE PREFERRED EMBODIMENTS

Figure 1:
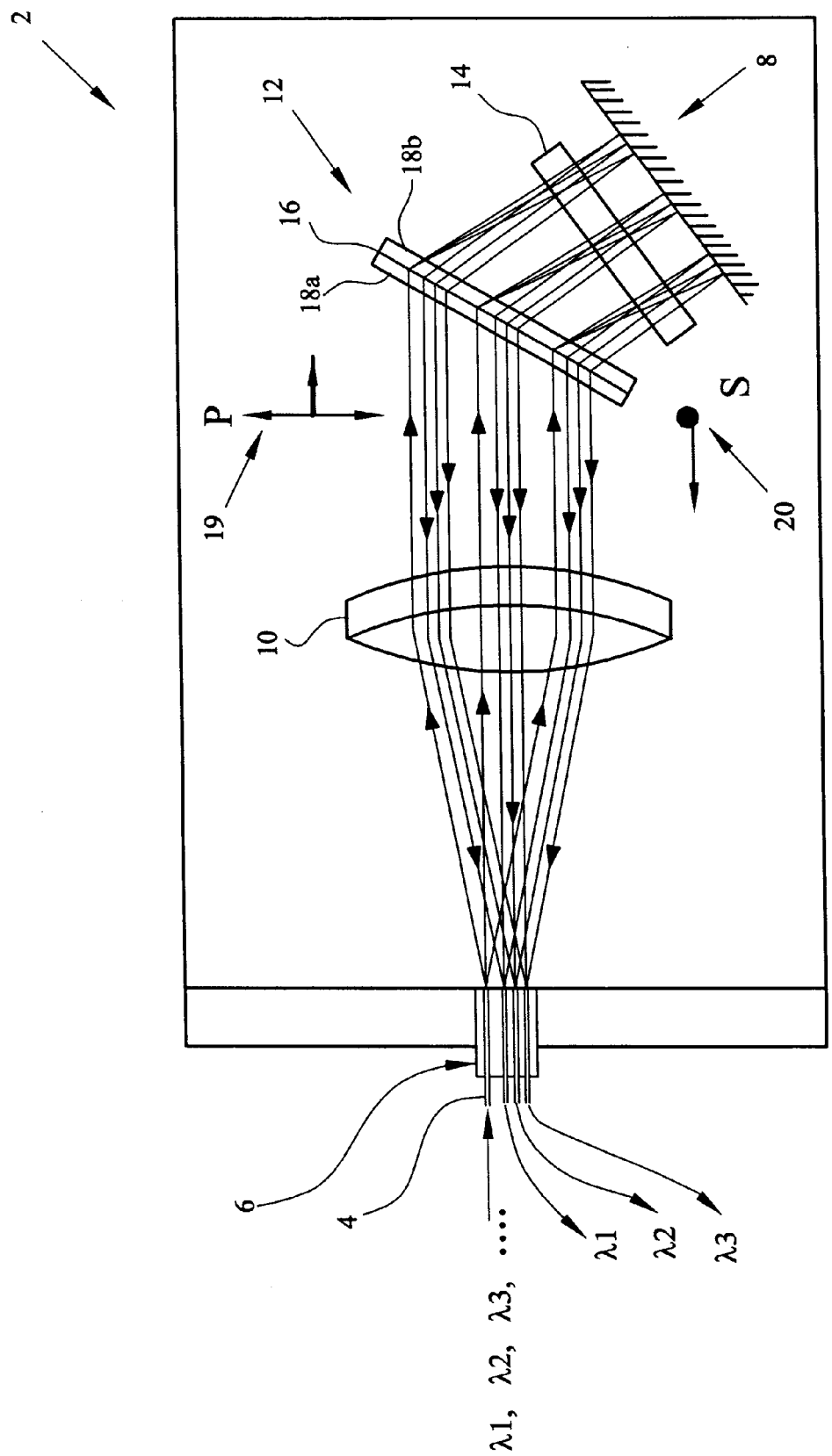
FIG. 1 is a block diagram illustrating a compact wavelength multiplexer-demultiplexer device having low polarization sensitivity in accordance with the present invention, the depicted device providing double passing of incoming beams through a grating, wherein the polarization state of each beam rotated by a polarization rotating element before the second pass.

FIG. 1 shows a block diagram generally illustrating an optical multiplexer-demultiplexer device at 2 in accordance with the present invention, the device 2 having an increased number of channels, reduced physical size, and low polarization sensitivity as further explained below. The device 2 generally includes: an input/output array of optical fibers 4 each terminating in a fiber end for radiating and receiving associated light beams; a fiber mounting assembly 6 configured to support the array optical fibers 4 so that the fiber ends terminate in substantially the same plane; a highly reflective mirror 8 for reflecting beams radiating from the fiber ends; a lens 10 for collimating and focusing beams propagating between the fiber ends and the mirror 8, the lens having a focal length associated therewith; a transmissive grating assembly 12 for diffracting beams propagating between the lens 10 and the mirror 8; and a polarization rotating element 14 disposed between the grating assembly 12 and the mirror 8, the polarization rotating element providing for rotating the polarization plane of beams passing therethrough for the purpose of achieving polarization insensitivity of the device 2 as further explained below. The grating assembly 12 is preferably disposed in an angular orientation to optimize diffraction efficiency and the first order of diffraction for a preferred wavelength range. The polarization rotating element 14 provides for randomizing polarization states of the beam so that the device is not sensitive to variations in the polarization state of the input signal as further explained below.

The device 2 operates generally in the same manner as the multiplexer-demultiplexer device described in the pending U.S. patent application Ser. No. 09/362,926, which, as mentioned above, is incorporated herein by reference. The device 2 is operative in a demultiplexing mode wherein a fiber end of a demultiplexer input one of the fibers 4 radiates a multi-channel beam including a plurality of wavelengths toward the mirror 8 via the lens 10, grating assembly 12, and polarization rotating element 14. The multi-channel beam is diffracted and angularly separated according to the wavelengths into a plurality of spatially dispersed single channel beams which are directed back to fiber ends of corresponding ones of a plurality of demultiplexer output ones of the fibers 4.

The device 2 is also operative in a multiplexing mode wherein each fiber end of a plurality of a multiplexer input ones of the fibers radiates a corresponding single wavelength signal towards the mirror 8 via the lens 10, grating assembly 12, and polarization rotating element 14. The single channel beams are collected, diffracted, rotated, and merged into a substantially collimated multi-channel beam including each of the single wavelengths, the collimated multi-channel beam being focused by the lens 10 toward the end of a multiplexer output one of the fibers 4. Note that in either of the multiplexer and demultiplexer modes, the input signals to the device may have a polarization state that varies with time as a result of a variety of properties of an optical communication system employing the device. Therefore, it is essential that the device 2 provide a substantially equal spectral resolution regardless of changes in the polarization state of the incoming beams.

The transmissive grating assembly 12 includes at least one substrate and a diffractive element 16. In one embodiment, the grating assembly 12 includes first and second substrates 18a and 18b, the diffractive element 16 being disposed between the first and second substrates. Each of the first and second substrates 18a and 18b may be formed from low scattering glass having surfaces coated with an anti-reflection coating to enhance the passage of radiation. The diffractive element 16 is preferably a holographic element comprising a photosensitive medium such as a photo-polymer material (e.g., dichromate gelatin) that provides a volume hologram. The photosensitive media are preferably materials that provide for high spatial resolution in order to provide a diffractive element 16 having a high groove density, thus providing high spectral resolution for DWDM applications of the device 2. Moreover, the photosensitive media are preferably materials that have low scatter, low optical noise and are capable of transmitting a range of wavelengths of interest. The photosensitive medium provides for a high diffractive efficiency and wide waveband operation. In one embodiment, the diffractive element 16 is formed by performing a holographic process utilizing the photosensitive medium. The fabrication of DCG holographic elements for different purposes has been described in several references such as: "Dichromated Gelatin for the Fabrication of Holographic Optical Elements" prepared by B. J. Chang and C. D. Leonard: Applied Optics, 18, 2407–2417 (1979). The manufacturing cost of forming holographic elements is low because the process is basically a photographic process.

The number of channels provided by the device 2 is increased by increasing the groove density of the diffractive element 16 of the grating assembly 12 (thereby reducing the groove spacing d) in order to provide higher dispersion and thus higher spectral resolution. The focal length f of the lens 10 is reduced while increasing the groove density in order to minimize the size of the device. Maintaining the focal length of the lens 10 while increasing the groove density of the diffractive element 16 allows for a smaller size device and increases the dispersion provided by the grating. However, increasing the groove density of the grating requires an increase in the optimal grating incidence angle. The optical grating incidence angle of a beam incident on the diffractive element 16 is defined based on the angular difference between the propagation direction of the beam and a vector that is normal to the surface of the element 16. Increasing the groove density of the grating leads to higher polarization sensitivity (i.e., the grating efficiency variation with respect to the orientation of input beam polarization state). As mentioned above, polarization sensitivity causes an increase in the polarization dependence of the device which is undesirable in optical communication systems. However, this problem is solved by the use of the polarization rotating element 14 as further explained below to which provide the capability of handling incident beams having varying polarization states. Therefore, the groove density of the diffractive element 16 of the grating assembly 12 may be increased, and the focal length f of the lens 10 can be reduced without incurring a high polarization dependence in the device 2 having the polarization rotating element 14 as further explained below.

In one embodiment, the polarization rotating element 14 comprises a magnetic-optic crystal providing a Faraday polarization rotating element for rotating the polarization plane of an incident light beam. The Faraday polarization rotating element provides Faraday rotation effects to rotate the plane of polarization of an incident beam by a specific angle, X degrees, relative to the initial plane of polarization of the incident light. The direction of rotation provided by the element 14 is independent of the propagation direction of the beam. Note that light beams pass through the polarization rotating element 14 twice in the device 2 as light beams propagate from the grating assembly 12 to the mirror 8 and back to the grating assembly. So, the plane of polarization of a beam incident on the element 14 is rotated X degrees as the beam propagates through the element 14 toward the mirror 8, and then is rotated an additional X degrees in the same direction after the mirror 8 reflects the incident beam back through the element 14 toward the grating assembly.

The polarization rotating element 14 may be formed from a magnetic-optic single crystal. In one embodiment, the magnetic-optic single crystal comprises magnetic garnet single crystals including bi-substituted iron garnet crystals produced by low pressure evaporation (LPE) crystal growth. Various sizes of the crystals are commercially available. References teaching the fabrication and use of such crystals are widely available. For example, "Polarization-independent Isolators for fiber optics" by T. Matsumoto, in Electronics & Communications in Japan (vol. 62-C #7, 1979, pp.113–118) teaches the fabrication and use of such crystals for various purposes other than use in an optical multiplexer-demultiplexer device providing low polarization sensitivity. As another example, U.S. Pat. No. 4,712,880, entitled "POLARIZATION ROTATION COMPENSATOR AND OPTICAL ISOLATOR USING THE SAME" issued to Masataka Shirasaki, et al. teaches the fabrication and use of such crystals. The magnetic garnet single crystals are characterized by low insertion loss and large Faraday effects in particular communication wavelengths. Such crystals are commonly used in optical isolators.

The amount of rotation provided by the polarization rotating element 14 depends on the strength of the magnetic field of the crystal and the thickness of the crystal. Therefore, by controlling the strength of the magnetic field, and the thickness of the single crystal, the angle of rotation provided by the element 14 can be varied. In one embodiment, the crystal element 14 is formed and orientated in order to provide a rotation of the plane of polarization of an incident light beam of approximately 45 degrees as the beam passes through the polarization rotating element 14. So, in this embodiment, the plane of polarization of a light beam is initially rotated approximately 45 degrees as the beam propagates through the element 14 toward the mirror 8, and is then rotated an additional 45 degrees in the same direction after the mirror 8 reflects the incident beam back through the element 14 toward the grating assembly 12.

A P-polarized light beam incident on the element 14 has a polarization plane P indicated at 19 that is parallel to the grating incidence plane which is defined by a line normal to the surface of the crystal and the propagation direction of the beam. An S-polarized light beam has a polarization plane S indicated at 20 that is perpendicular to the grating incidence plane. A P-polarized beam propagating from the grating assembly 12 to the element 14 is rotated 45 degrees from the P polarization position after passing through the element 14 once. The polarization plane of the beam is further rotated an additional 45 degrees in the same direction after it is reflected by the mirror 8 and passed through the element 14 once again. Therefore, the total rotation of the polarization plane of the beam passing twice through the element 14 is substantially close to 90 degrees. Therefore, a P-polarized light beam is rotated to be an S-polarized light beam after propagating twice through the element 14. Likewise, an S-polarized light beam is rotated to be a P-polarized light beam after propagating twice through the element 15.

Assume that the diffractive element 16 of the grating assembly 12 provides a diffraction efficiency Ep for P-polarized light, and a diffraction efficiency Es for S-polarized light. As mentioned above, the groove density of the diffractive element 16 is increased (and the groove spacing d is decreased) to provide a larger dispersion while the focal length f of the lens 10 is decreased in order to minimize the physical size of the device 2. The diffraction efficiencies Ep and Es of the diffractive element 16 vary as the groove density of the diffractive element 16 is increased. For incoming P-polarized light propagating from the lens 10 and passing through the diffractive element 16, the diffractive element 16 provides a diffraction efficiency $E_P$. For outgoing S-polarized light (resulting from the P-polarized light passing twice through the element 14 as described above) passing through the diffractive element 16, the diffractive element 16 provides a diffraction efficiency Es. Therefore, the total diffraction efficiency for the double pass device 2 is Ep·Es for an incoming beam having a P-polarization state. Similarly, for incoming S-polarized light propagating from the lens 10 toward the diffractive element 16, the diffractive element 16 provides a diffraction efficiency $E_S$, and for outgoing P-polarized light propagating from the mirror 8 toward the diffractive element 16 via the polarization rotating element 14, the diffractive element 16 provides a diffraction efficiency $E_P$. Therefore, the total diffraction efficiency provided by the double pass device 2 is $E_P \cdot E_S$. Therefore, the device 2 of the present invention provides uniform diffraction efficiency, and uniform transmission efficiency or loss, regardless of the polarization state of the incoming light beam, and even though the diffraction efficiency of the diffractive element 16 varies as a function of the polarization state of light beams passing there through.

Although the aforementioned discussion has been described in terms of P-polarized and S-polarized light, it is well understood that the device 2 responds similarly to randomly polarized light. The device 2 of the present invention provides substantially the same overall diffraction efficiency, and thus the same transmission efficiency or loss, regardless of the state polarization state of the incoming beam. The device 2 provides double pass dispersion and polarization rotation as described above, and also provides a dense wavelength division multiplexer-demultiplexer (DWDM) device having low or zero polarization dependence, high spectral resolution, a large number of channels, and narrow channel spacing.

Figure 2:
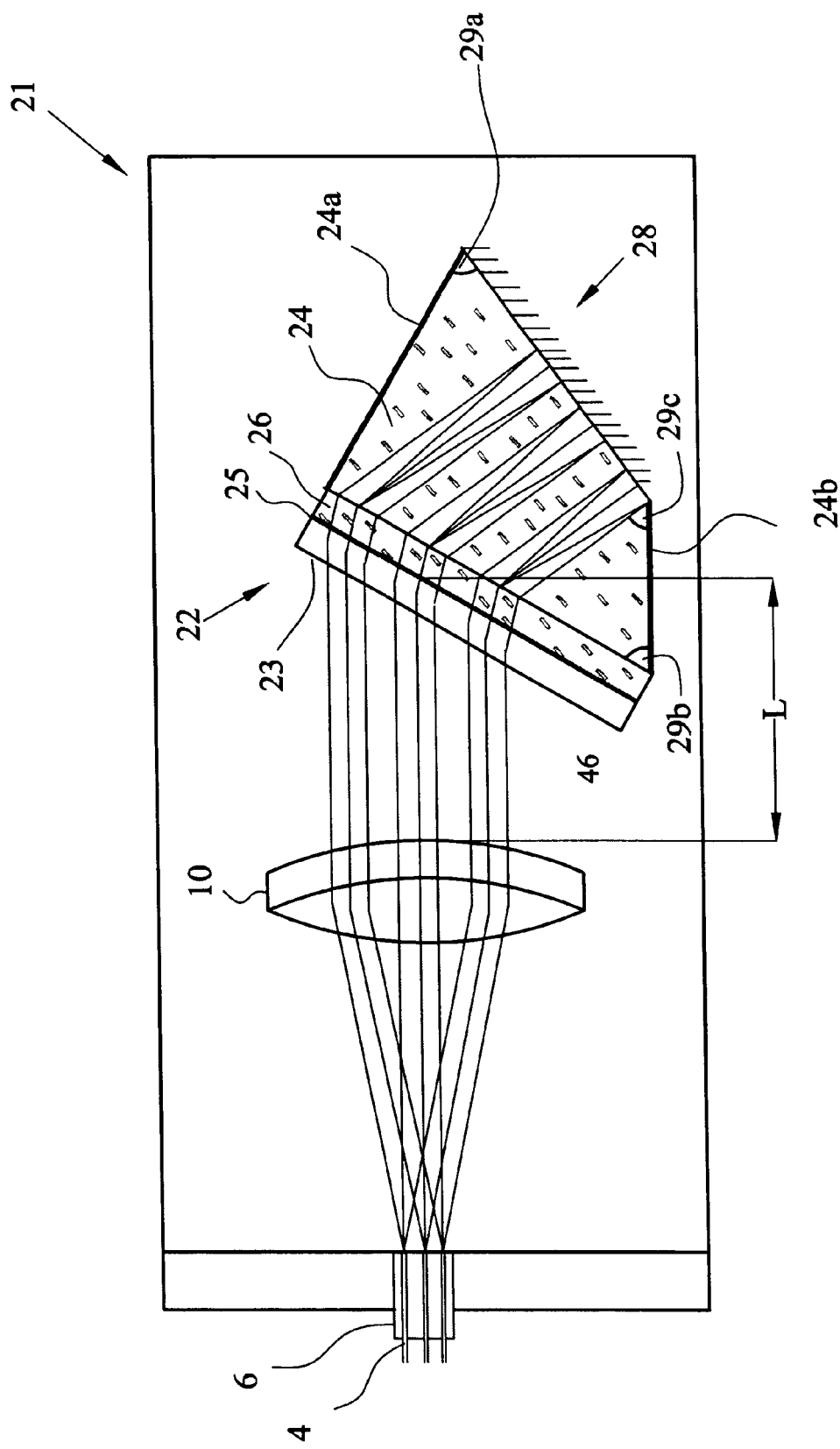
FIG. 2 is a block diagram illustrating an alternative embodiment of the double pass device of FIG. 1 that is formed using integrated optical elements.

FIG. 2 shows a block diagram generally illustrating an alternative embodiment of a multiplexer-demultiplexer device at 21 in accordance with the present invention. The device 21 is an alternative embodiment of the double pass device 2 (FIG. 1) that is formed using integrated optical elements. The device 21 includes the array of fibers 4 supported by the mounting assembly 6. An integrated optical substrate assembly 22 includes: a first and second substrates 23 and 24, each being formed from low scattering optical glasses (e.g., BK7 or fused silica optical glass); a diffractive element 25 disposed between the first and second substrates 23 and 24, and having a first surface contiguous with a surface of the first substrate 23 that is opposite the lens 10, and a second surface; a polarization rotating element 26 disposed between the diffractive element 25 and second substrate 24, and having a first surface contiguous with the second surface of the diffractive element 25, and a second surface contiguous with a surface of the second substrate 24. The polarization rotating element 26 includes a magnetic-optic single crystal. The contiguous surfaces of the diffractive element 25, first substrate 23, element 26, and second substrate 24 are bounded refractive index matching optical adhesives.

The surfaces of the first substrate 23 are polished and preferably coated with anti-reflection coating to enhance the high efficient passage of the aforementioned radiation range. The diffractive element 25 has the same characteristics as the above described diffractive element 16 (FIG. 1).

The polarization rotating element 26 provides a function similar to the function provided by the polarization rotating element 14 (FIG. 1). Because the grating assembly 22 and the polarization rotating element 26 assembly of the device 21 are formed to be monolithic, the mechanical and environmental (thermal, stress, et al.) responses of the device are improved.

A surface 28 of the second substrate 24 is polished and coated with highly reflective coating, and is formed and polished to have an angular orientation for reflecting beams in order to reverse the beam paths at preferred angular directions according to their wavelengths. Outer surfaces 24a and 24b of the second substrate 24 are polished and then coated with highly absorbing paint in order to absorb any stray radiation in the aforementioned specific wavelength ranges. Moreover, the second substrate 24 is preferably formed to have specific corner angles 29a, 29b and 29c. This minimizes the possibility of internal multi-reflections (which should be minimal due to the aforementioned highly absorbing paint) from either of the side surfaces of 24a and 24b back to the array of fibers. Therefore, inter-channel cross talk is minimized.

Figure 3:
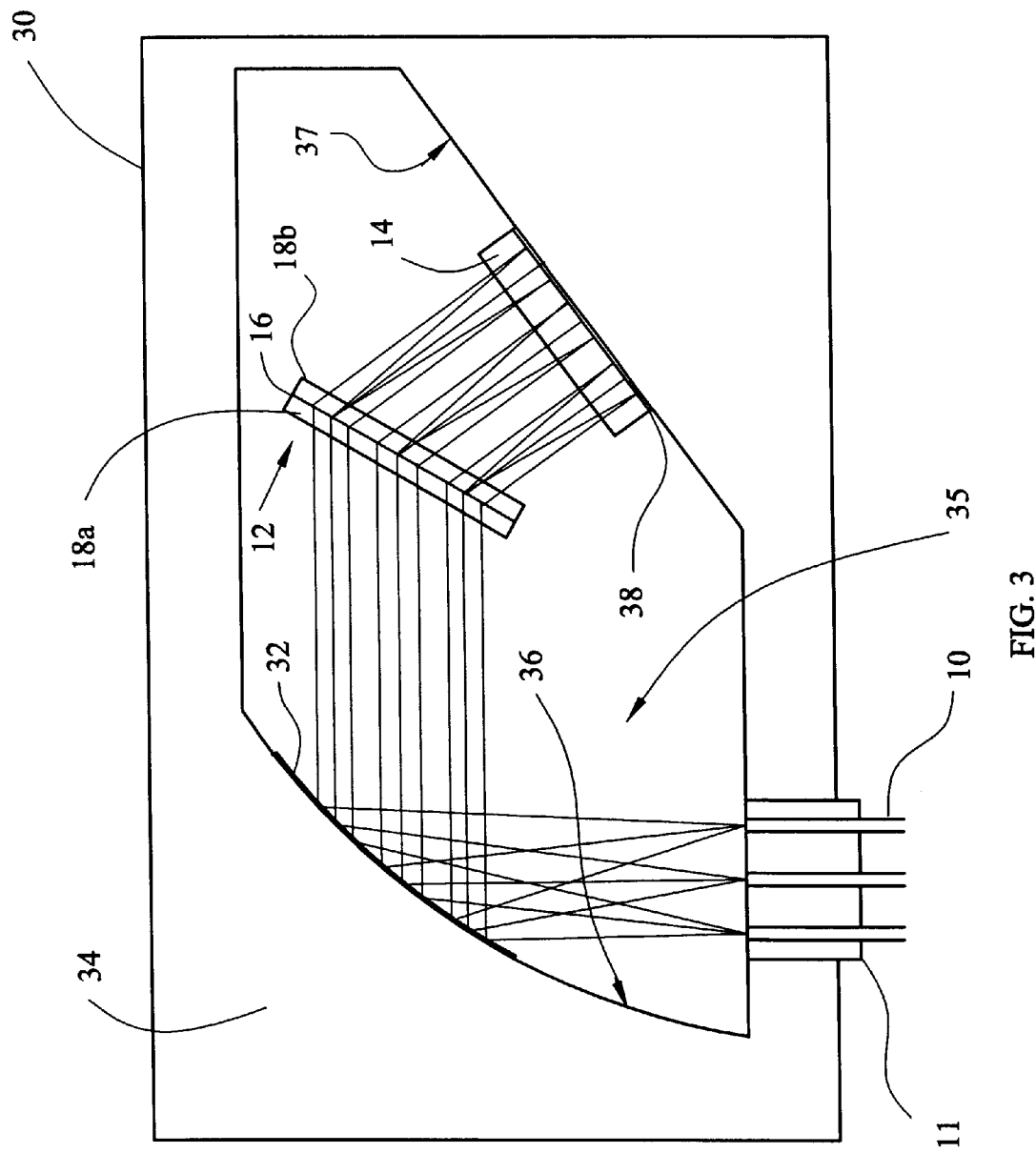
FIG. 3 is a block diagram illustrating another embodiment of a double pass device in accordance with the present invention, the device including a body forming a chamber having a wall at least a portion of which is polished to form an off axis parabolic mirror for collimating and focusing beams.

FIG. 3 shows a block diagram generally illustrating another alternative embodiment of a multiplexer-demultiplexer device at 30 in accordance with the present invention. The device 30 is a double pass device and operates in a manner similar to the device 21 (FIG. 2) except that an off-axis parabolic mirror 32 is used to replace the focusing/collimating lens. The surface of the mirror 32 is preferably parabolic shaped but may be formed to have any other suitable shape that produces the desired collimating/focusing function. For example, the surface of the mirror 32 can be a concave surface mirror. The parabolic mirror 32 is polished and preferably coated with anti-reflection coating to enhance the high reflectance in the aforementioned radiation range. Note that the off-axis parabolic mirror 32 provides less chromatic aberration than the focusing lens 10 (FIG. 2).

In one embodiment, the device includes a body 34 forming a chamber 35 having a first wall 36 at least a portion of which is shaped and polished to form the off axis parabolic mirror 32 for collimating and focusing beams. The body 34 is machined from a single piece of low thermal expansion material, such as low expansion metal, plastic, glass or ceramic materials. For example, the body 34 can be machined from a single piece of low expansion metal (e.g., Invar).

The chamber of the body 34 further includes a second wall 37 having a portion 38 which is polished to form a reflective surface. The polarization rotating element 14 is attached to the polished portion 38 of the wall 37. In an embodiment, each of the reflective surfaces 32 and 38 has a coating that is highly reflective in the aforementioned radiation range.

The device 30, which includes integral optical components machined on a single body, provides the advantage of being rugged, and therefore substantially immune to stress and temperature variations. Furthermore, alignment of optical components of the device 30 is easy because the integrated optical components are machined onto the single body 34.

Figure 4:
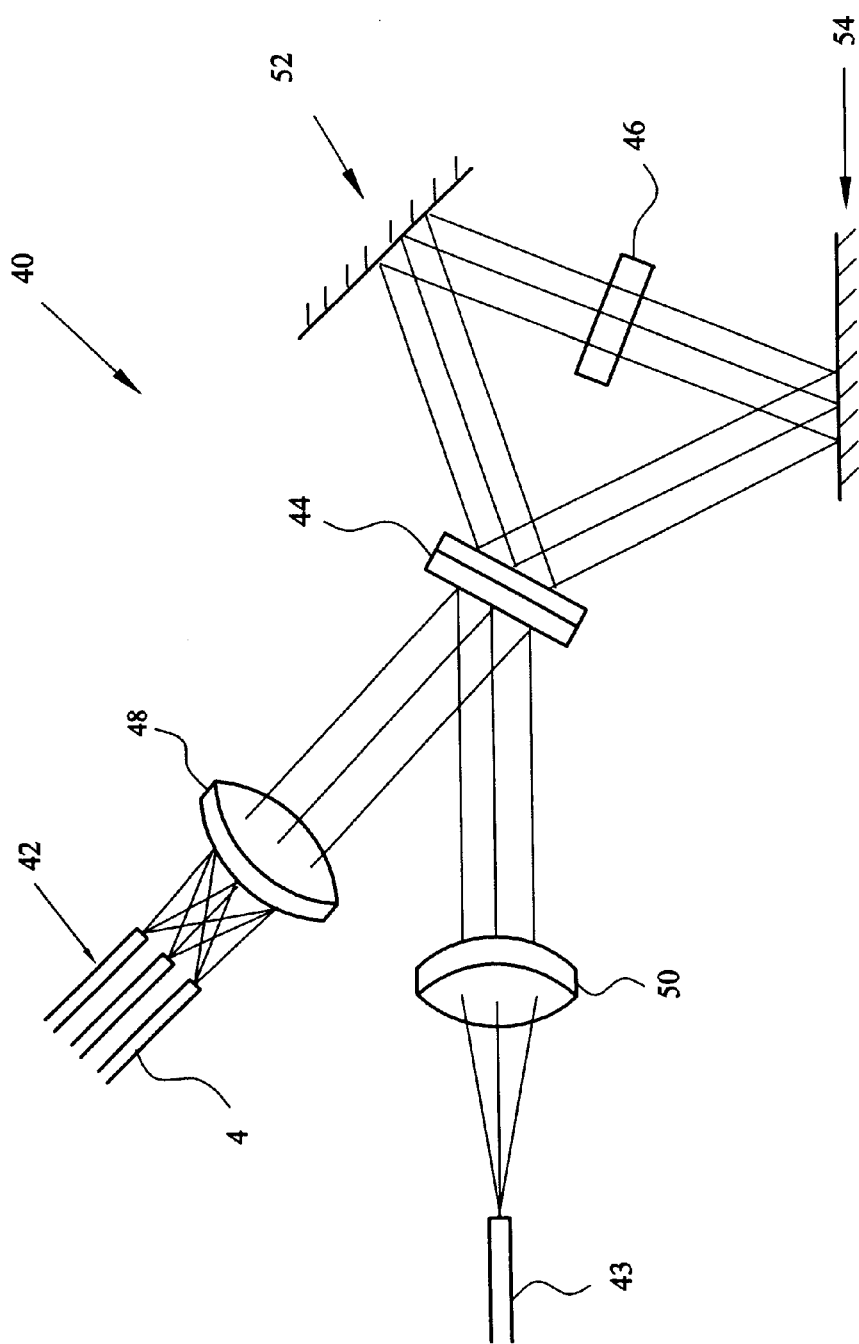
FIG. 4 is a block diagram illustrating another embodiment of a double pass device in accordance with the present invention, the device having two reflective elements for reflecting beams propagating between a diffractive element and a polarization rotating element.

FIG. 4 shows a block diagram generally illustrating a further alternative embodiment of a multiplexer-demultiplexer device at 40 in accordance with the present invention. The device 40 includes: a first fiber mounting assembly (not shown) configured to support an array 42 of optical fibers 4 so that the fiber ends terminate in substantially the same plane, each of the fibers 4 being either a multi-mode fiber or a single mode fiber; a second fiber mounting assembly (not shown) configured to support a single fiber 43 that is either a multi-mode fiber or a single mode fiber; a transmissive grating assembly 44 having a diffractive element for diffracting beams propagating therethrough; a polarization rotating element 46 for rotating the polarization plane of beams passing therethrough; a first focusing and collimating lens 48 for focusing and collimating beams propagating between the ends of the array 42 of fibers and the grating assembly 44, the first lens having a focal length associated therewith; a second focusing and collimating lens 50 for focusing and collimating beams propagating between the end of the single fiber 43 and the grating assembly 44, the second lens having a second focal length associated therewith; a first mirror 52 for reflecting beams radiating between the array 42 of fibers and the polarization rotating element 46 via the grating assembly 44; and a second mirror 54 for reflecting beams radiating between the single fiber 43 and the polarization rotating element 46 via the grating assembly 44. The grating assembly 44 is a transmissive grating that is similar to the grating assembly 12 (FIG. 1). The end of the fiber 43 is located at the vicinity of the focal point of the collimating lens 50 which is formed from at least one piece of optical glass. The focusing lens 48 and collimating lens 50 may be fabricated in the same manner as the lens 10 (FIG. 1) or in a similar manner.

In one embodiment, the polarization rotating element 46 is formed in the same manner as the polarization rotating element 14 (FIG. 1). In another embodiment, the polarization rotating element 46 is constructed from a single optical active crystal such as crystal quartz. This type of polarization rotating element is commercially available and has been described in many references to be useful in a wide variety of devices other than reducing polarization sensitivity in wavelength division multiplexer-demultiplexer devices. The polarization rotating element 46 is alignment insensitive in that the direction of rotation provided by the element 46 is independent of the propagation direction of the beam.

In one embodiment, the crystal of the polarization rotating element 46 is formed and orientated to rotate the plane of polarization of an incident light beam by approximately 90 degrees as the beam passes once therethrough. In this embodiment, a P-polarized beam propagating from the grating assembly 44 to the element 46 is rotated 90 degrees from the P-polarization position after passing through the element 46 once. Therefore, a P-polarized light beam is rotated to create an S-polarized light beam after propagating once through the element 46. Likewise, an S-polarized light beam is rotated to create a P-polarized light beam after propagating once through the element 46.

During operation in a demultiplexer mode, an input beam having mixed wavelengths and being radiated from the end of the single fiber 43 is substantially collimated by the lens 50 and then impinged on the grating assembly 44 which diffracts and angularly separates the beam into a number of individual collimated beams according to the number of wavelengths in the mixed beam. The spatially separated beams are reflected and redirected by the first mirror 54 toward the polarization rotating element 46. The beams pass through the element 46 and are redirected by the second mirror 52 to the grating assembly 44 which further diffracts the beams and makes further spatial separation of the individual wavelengths. The spatially dispersed collimated beams are then focused by the lens 48 and received directly by associated ones of the array 42 of optical fibers. By reversing the beam directions, the device may operate in a multiplexer mode.

Assume that the diffraction efficiency provided by the grating assembly 44 is Ep for a P-polarized light incident light beam having a plane of polarization that is P-polarized with respect to the groove direction of the diffractive element of the grating assembly 44. Assume also that the diffraction efficiency provided by the grating assembly 44 is $E_S$ for an S-polarized light incident light beam having a plane of polarization that is S-polarized with respect to the groove direction of the diffractive element of the grating assembly. Each of the diffraction efficiencies Ep and Es may vary as the groove density of the grating assembly 44 is substantially increased to provide larger dispersion.

During operation in the demultiplexer mode, the grating assembly 44 provides a diffraction efficiency Ep for a P-polarized input light beam on the first pass therethrough from the lens 50 to the mirror 54. The once diffracted input light beam is reflected by the mirror 54, and its plane of polarization is rotated by the polarization rotation element 46 to create an S-polarized input light beam which is reflected by the mirror 52, and passed through the grating assembly 44 which provides a diffraction efficiency $E_S$ for the S-polarized input light beam. The total diffraction efficiency in the device 40 provided for the double pass through the grating assembly 44 is therefore Ep·Es. Similarly, for incoming S-polarized light, the diffraction efficiency for the first pass is Es, and the diffraction efficiency for the second pass is $E_P$ since S-polarized light is rotated to P-polarized light by the element 46 between the first and second passes through the grating assembly, and thus the total diffraction efficiency for the double pass is $E_P$·Es.

Although the aforementioned discussion has been described in terms of P-polarized and S-polarized light, it is understood that the device 40 will respond similarly to randomly polarized light. A device in accordance with the present invention produces substantially the same total diffraction efficiency, and thus the same transmission efficiency regardless of the state polarization of the incoming beam(s).

An important advantage of the device 40 is that it provides a multiplexer/demultiplexer having low or zero polarization dependency. The device 40 also enables easy optical alignment construction. It is more convenient to achieve optical alignment in this embodiment as compared to the device 2 (FIG. 1). This is because the beam pass is separated but at the same time it still provides the advantages of a double pass device.

Figure 5:
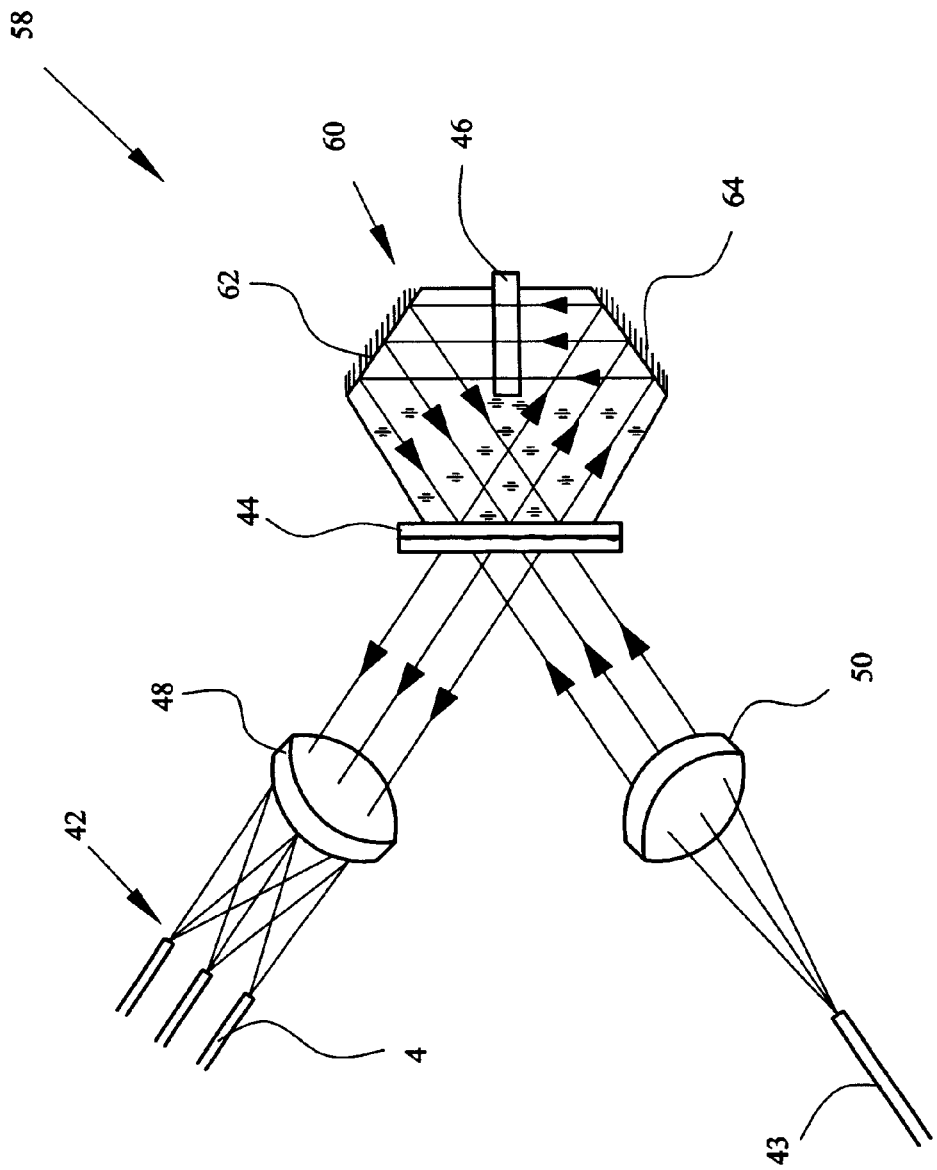
FIG. 5 is a block diagram illustrating an alternative embodiment of the double pass device of FIG. 4 wherein the device includes a body forming a chamber having first and second walls polished to form the two reflective elements.

FIG. 5 shows a block diagram generally illustrating an alternative embodiment of an optical device in accordance with the present invention at 58 having integrated optical parts. The components of the device 58 are similar to the components of the device 40 (FIG. 4) except that an integrated prism 60 having first and second reflective surfaces 62 and 64 is used to replace the individual mirrors 52 and 54 (FIG. 4). The surfaces of the first and second reflective surfaces 62 and 64 are preferably substantially planar and coated with anti-reflection coating to enhance the high reflectance in the aforementioned radiation range. The polarization rotation element 46 provides 90 degrees of rotation of the polarization plane of light beams passing therethrough, and is formed from an optically active crystal that is disposed in the beam path by refractive index matching of optical adhesives. It is noted that this alternative embodiment provides an advantage of low mechanical and environmental stress responses because the grating assembly 44 and polarization rotation element 46 are formed to be monolithic. It is also easier to control fabrication of the device 58 than it is to control fabrication of the device 40 (FIG. 4) which is formed from separate components.

Figure 6:
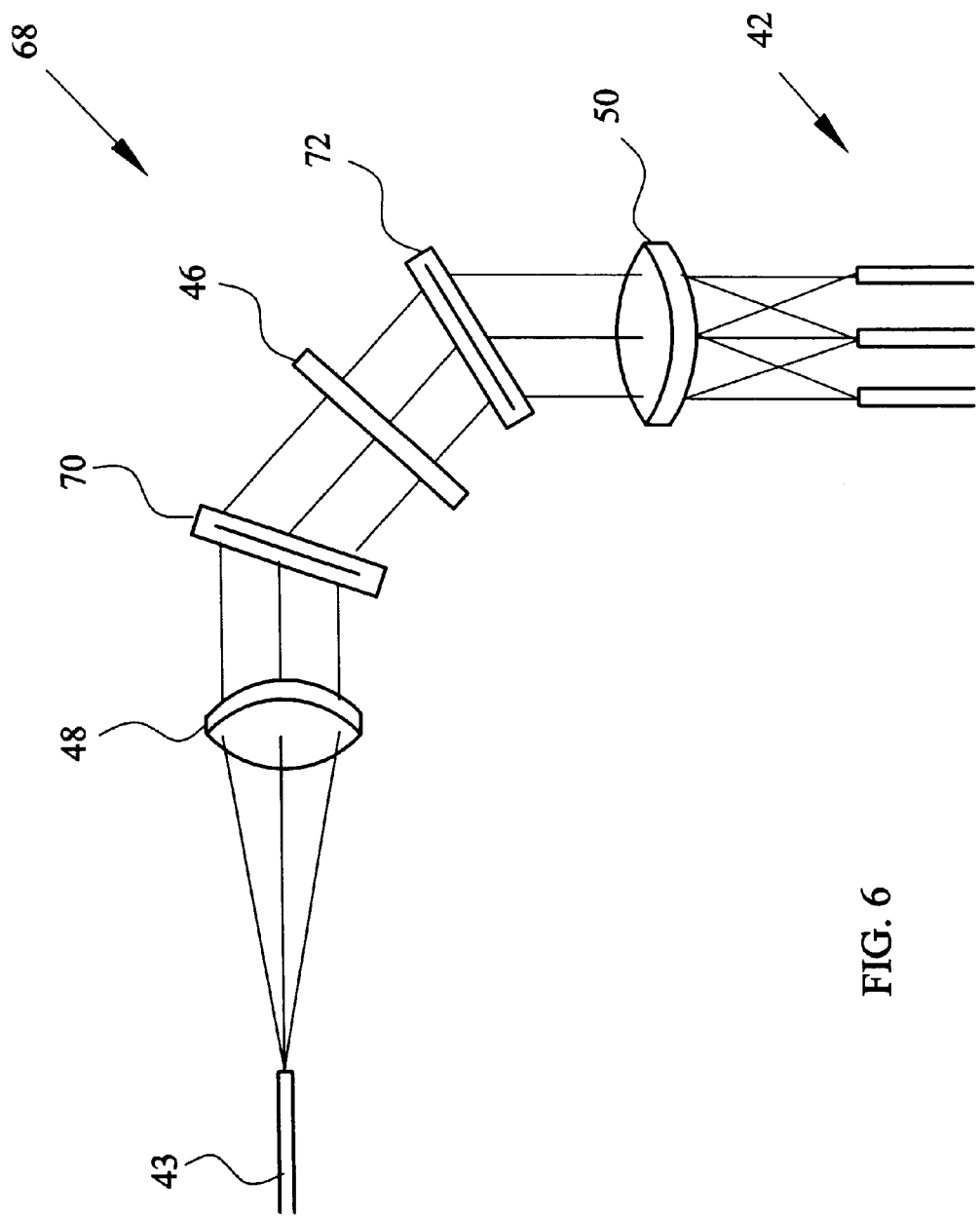
FIG. 6 is a block diagram illustrating another embodiment of a device providing low polarization sensitivity in accordance with the present invention, the device including a polarization rotating element disposed between two separate diffractive elements.

FIG. 6 shows block diagram generally illustrating another alternative embodiment of a device in accordance with the present invention at 68 that is further modified to include two identical or similar grating assemblies. The components of the device 68 are otherwise similar to the components of the device 58 (FIG. 5) except that first and second gratings 70 and 72 are provided. In one embodiment, each of the gratings 70 and 72 is similar to the grating assembly 44 (FIG. 5). The polarization rotating element 46 is constructed by a single optical active crystal, for example, crystal quartz. The polarization rotating element rotates the polarization plane of incident light by an angle that is substantially close to 90 degrees. It is noted that this alternative embodiment provides the advantage of simplified optical alignment but adds one more grating and a longer mechanical path.

Figure 7:
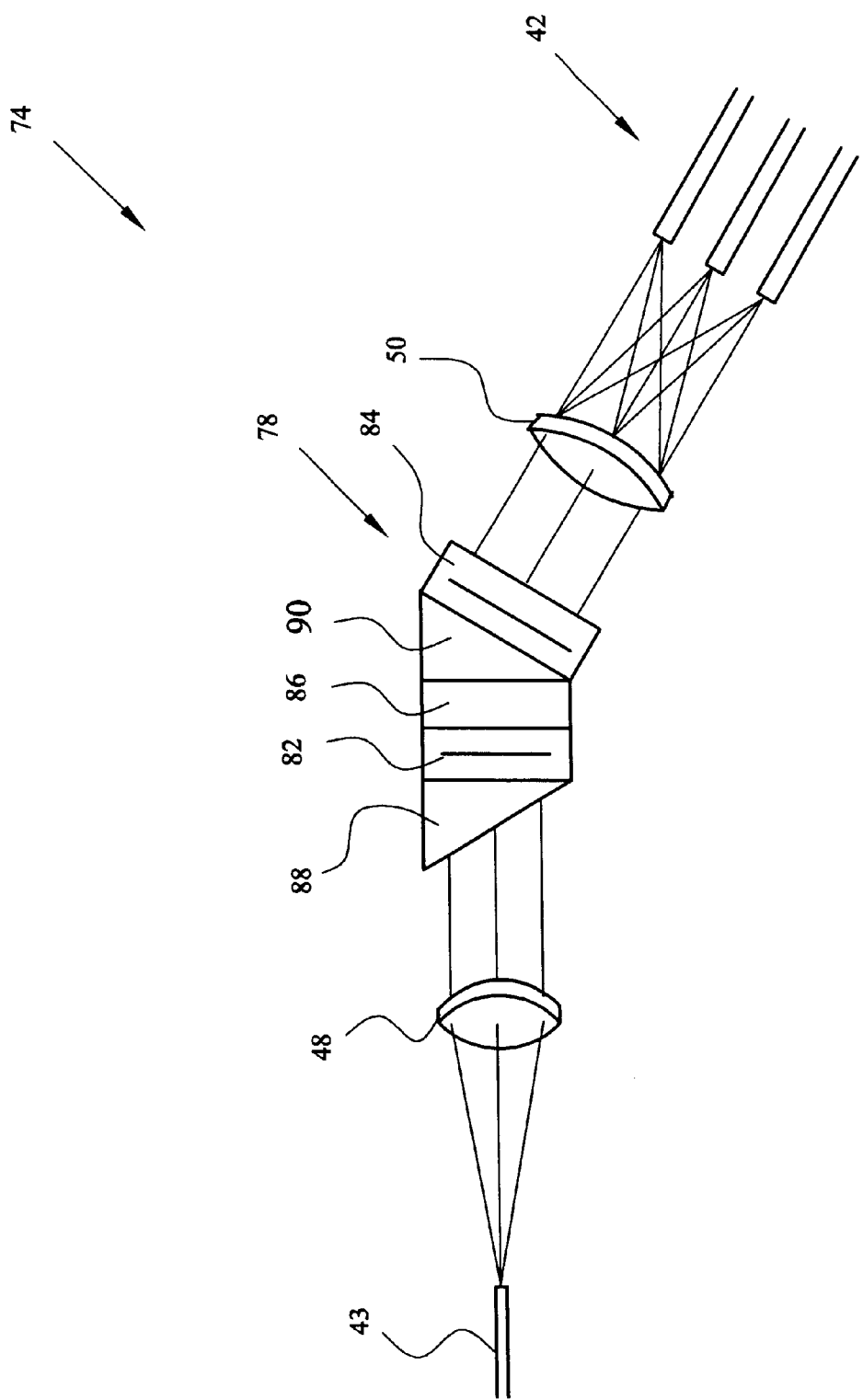
FIG. 7 is a block diagram illustrating an alternative embodiment of the single pass device of FIG. 6 that is formed using integrated optical elements.

FIG. 7 shows a block diagram generally illustrating yet another alternative embodiment of a device in accordance with the present invention at 74 that is similar to the device 68 (FIG. 6) but further modified to include an assembly 78 of integrated optical components positioned between the first and second lenses 48 and 50. The integrated assembly 78 includes: first and second gratings 82 and 84 each being constructed in a manner similar to the grating assembly 16 (FIG. 1), and each having opposite planar surfaces; a polarization rotating element 86 similar to the element 46 (FIG. 6) and having opposite planar surfaces; a first optical wedge 88 having a planar surface that is contiguous with and bonded to a first planar surface of the first grating 82 by refractive index matching optical adhesives; and a second optical wedge 90 having a first planar surface that is contiguous with and bonded to a planar surface of the second grating 84 by refractive index matching optical adhesives, and a second planar surface that is contiguous with and bonded to a planar surface of the polarization rotating element 86 by refractive index matching optical adhesives.

Each of the optical wedges 88 and 90 comprises a glass prism formed from an optical glass such as fused silica or any other suitable type of optical glass. The surfaces of the wedges 88 and 90 are polished and the angles of the wedge are calculated and formed so that a beam passing through the wedges 88 and 90 is directed to be incident on the gratings 82 and 84 at selected incidence angles to allow the gratings 82 and 84 to provide maximum diffraction efficiency. Note that because the device 74 includes monolithic components, the device is rugged and substantially immune to mechanical and environmental stress. Also, it is easier to control the manufacturing process for fabricating the device 74 than for fabricating devices made of separate components as described in the device 68 (FIG. 6).

FIG. 8A shows block diagram generally illustrating another embodiment of a device at 92 that is similar to the device 74 (FIG. 7) but is further modified to include an assembly 94 of integrated optical components positioned between the first and second lenses 48 and 55 which are positioned between an array 95 of fibers 4 and the single fiber 43. The integrated assembly 94 includes: a first grating 96 having first and second opposing planar surfaces, and having a first grating orientation defined by a first groove distribution direction as further explained below; a second grating 98 having first and second opposing planar surfaces, and having a second grating orientation defined by a second groove distribution direction, the first and second groove distribution directions of the first and second gratings 96 and 98 being perpendicular to each other as further explained below; a first optical wedge 100 having first and second planar surfaces, one of which is contiguous with one of the planar surfaces of the first grating 96; and a second optical wedge 102 having first and second planar surfaces one of which is contiguous with one of the planar surfaces of the second grating 98. The wedges 100 and 102 are similar to the wedges 88 and 90 (FIG. 7). Note that no polarization rotating element is provided in the device 92. Instead, polarization insensitivity is achieved by providing the two gratings having groove directions which are orthogonal to each other in order to provide an effective rotation of the plane or polarization of beams passing through the assembly 94.

FIG. 8B shows a block diagram generally illustrating the groove distribution direction at 106 of the first grating 96 (FIG. 8A). FIG. 8C shows a block diagram generally illustrating the groove distribution direction at 108 of the second grating 98 (FIG. 8A). Note that the groove directions of the first and second gratings are orthogonal to each other. Note also that the groove spacing d of each of the gratings is equal.

Referring back to 8A, assume that the diffraction efficiencies of the first and second gratings 96 and 98 are Ep and Es for P-polarized and S-polarized light respectively. Note also that Ep and Es may vary as the groove density is substantially increased to provide large dispersion. For an incoming light beam that is P-polarized, the diffraction efficiency for light passing through the first grating 96 is Ep and the diffraction efficiency for the same light beam passing through the second grating 98 is Es because P-polarized light relative to the first grating 96 is S-polarized light relative to the second grating 98 due to its orientation. Therefore, the total diffraction efficiency provided by the gratings 96 and 98 for a beam passing through the assembly 94 is Ep·Es. Thus, the total diffraction efficiency provided by the gratings 96 and 98 for a beam having any polarization state passing through the assembly 92 is Ep·Es. Assuming that the two gratings 96 and 98 are substantially identical in terms of diffraction efficiency, the device 92 of the present invention provides the same total diffraction efficiency (Ep·Es) and thus the same transmission efficiency or loss regardless of the state of polarization of an incoming beam.

It is convenient to arrange an optical device in a straight optical path, and it is advantageous in terms of both performance and cost for some applications if the whole device 92 is mounted in a low expansion straight mechanical tube.

It is noted that the device 92 eliminates the polarization rotating element of 84 (FIG. 7). However, the total dispersion value provided by the gratings 96 and 98 is approximately equal to the dispersion value produced by a single grating multiplied by 1.414 (the square root of 2). Furthermore the focused beams at 104 of different wavelengths will form a line that is substantially close to 45 degrees from the horizontal diffraction.

FIG. 8D shows a fiber mounting assembly 110 that is configured to support the array 95 (FIG. 8A) of fibers in a diagonal line that is set at a 45 degree angle with respect to either of the first and second groove distribution directions.

FIG. 9 shows a block diagram illustrating yet another alternative embodiment of a compact wavelength multiplexer-demultiplexer device at 120 in accordance with the present invention. The device 120 is similar to the device 30 (FIG. 3), except that the off-axis parabolic mirror 32 (FIG. 3) and the grating assembly 12 (FIG. 3) are replaced with a concave grating 122. The surface of the concave grating 122 preferably includes spherical or aspherical shaped reflective gratings that produce desired collimating/focusing/dispersing functions. The grating 122 is preferably coated with anti-reflection coating to enhance the high reflectance in the aforementioned radiation range. Also, a polarization rotating element 124 is attached to a mirror surface 126 by optical adhesive. Note that this alternative embodiment provides the advantage of having fewer components. It is also noted that the embodiment may be expanded to apply to devices having plane gratings combined with focusing mirrors or lenses.

The invention provides a multiplexer-demultiplexer device for fiber optic communication networks, in particular, a DWDM device with low insertion loss, low inter-channel cross-talk, low polarization sensitivity and a capability to handle a large number of channels in a small mechanical package. The device is small, lightweight, substantially immune to temperature variation, polarization variation and stress-induced instability, and is also inexpensive to produce.

Although the present invention has been described in terms of specific embodiments, it is anticipated that alterations and modifications thereof will no doubt become apparent to those skilled in the art. It is therefore intended that the following claims be interpreted as covering all such alterations and modifications as fall within the true spirit and scope of the invention.

We claim:

1. An optical multiplexing and demultiplexing device comprising:

fiber mounting means for securing a plurality of optical fibers each terminating in a fiber end, at least one of said fiber ends radiating a corresponding input beam having a polarization state defined by a polarization plane orientation, and at least one of said fiber ends for receiving an output beam;

collimating and focusing means having a focal length associated therewith, and providing collimation of said input beam, and focusing of said output beam;

diffraction means including at least one transmissive diffractive element for diffracting optical beams passing therethrough, each said diffractive element having an associated diffraction efficiency that depends on the polarization state of a light beam passing therethrough;

a reflective element;

polarization rotating means disposed between said reflective element and said diffraction means for rotating the polarization plane orientation of a light beam passing through said rotating means; and wherein a particular input beam having a first polarization state is transmissively diffracted a first time by said diffraction means in accordance with a first diffraction efficiency that depends on said first polarization state, passed through said polarization rotating means a first time, reflected by said reflective element back to said polarization rotating means, passed through said polarization rotating means a second time and thereby rotated into a second polarization state, and transmissively diffracted a second time by said diffraction means in accordance with a second diffraction efficiency that depends on said second polarization state, whereby the device provides a total diffraction efficiency that is substantially insensitive to the polarization state of said input beam.

2. A device as recited in claim 1 wherein said polarization rotating means comprises a magnetic-optic crystal.

3. A device as recited in claim 2 wherein said magnetic-optic crystal comprises a magnetic garnet single crystal.

4. A device as recited in claim 2 wherein said polarization rotating means provides for rotating the plane of polarization of a beam passing once therethrough by approximately 45 degrees.

5. A device as recited in claim 1 wherein said transmissive diffractive element includes at least one planar surface, and wherein said polarization rotating means is formed by a crystal having at least one planar surface, and wherein said planar surface of said transmissive diffractive element is contiguous with said planar surface of said polarization rotating means.

6. A device as recited in claim 1 wherein said collimating and focusing means comprises an off-axis parabolic mirror.

7. A device as recited in claim 6 wherein said device comprises means forming a chamber having a first wall forming a parabolic surface at least a portion of which is polished to provide said off-axis parabolic mirror, and a second wall having a planar surface at least a portion of which is polished to provide said reflective element.

8. A device as recited in claim 7 wherein said polarization rotating means is formed by a crystal having at least one planar surface, and wherein said planar surface of said crystal is contiguous with the polished portion of said second wall.

9. A device as recited in claim 1 wherein said collimating and focusing means comprises an off-axis parabolic mirror, and wherein said polarization rotating means is formed by a crystal having at least one planar surface, and wherein said reflective element has a planar surface, and wherein said planar surface of said crystal is contiguous with said planar surface of said reflective element.

10. An optical multiplexing and demultiplexing device, comprising:

fiber mounting means for securing a plurality of optical fibers each terminating in a fiber end, at least one of said fiber ends radiating a corresponding input beans having a polarization state defined by a polarization plane orientation, and at least one of said fiber ends for receiving an output beam;

collimating and focusing means having a focal length associated therewith, and providing collimation of said at least one input beam, and focusing of said at least one output beam;

a dual grating assembly including,
   a first diffractive element having a first grating orientation defined by a first groove distribution direction, and
   a second diffractive element having a second grating orientation defined by a second groove distribution direction, said first and second groove distribution directions being substantially orthogonal to each other, said first and second diffractive elements for diffracting optical beams passing therethrough, each said difftactive element having an associated diffraction efficiency that depends on the polarization state of a light beam passing therethrough; and said fiber mounting means including first and second fiber mounting assemblies, said first fiber mounting assembly for securing a single optical fiber terminating in a fiber end, said second fiber mounting assembly for securing an array of secondary optical fibers each terminating in a fiber end, said array of secondary optical fibers being arranged along a line diverging at angle with respect to said first and second groove distribution directions;

wherein a particular input beam having a first polarization state is diffracted by said first diffractive element in accordance with a first diffraction efficiency based on said first polarization state, and diffracted by said second diffractive element in accordance with a second diffraction efficiency, whereby the device provides a total diffraction efficiency that is substantially insensitive to variations in the polarization state of said at least one input beam.

11. A device as recited in claim 10 wherein said second fiber mounting assembly provides for securing said array of secondary optical fibers along a line diverging at an angle of approximately 45 degrees with respect to each of said first and second groove distribution directions.

12. An optical multiplexing and demultiplexing device comprising:

first and second fiber mounting assemblies, said first fiber mounting assembly for securing a single optical fiber terminating in a fiber end, said second fiber mounting assembly for securing an array of secondary optical fibers each terminating in a fiber end, at least one of said fiber ends radiating a corresponding input beam having a polarization state defined by a polarization plane orientation, and at least one of said fiber ends for receiving an output beam;

diffraction means including at least one diffractive element for diffracting optical beams passing therethrough, each said diffractive element having an associated diffraction efficiency that depends on the polarization state of a light beam passing therethrough; and a first lens for focusing and collimating beams propagating between the end of said single fiber and said diffraction means;

a second lens for focusing and collimating beams propagating between the ends of said array of optical fibers and said diffraction means;

a polarization rotating means for rotating the polarization plane orientation of a light beam passing therethrough;

a first reflective element for reflecting beams radiating to and from said single fiber via said diffraction means, and for reflecting beams radiating to and from said polarization rotating means; and a second reflective element for reflecting beams radiating to and from said array of optical fibers via said diffraction means, and for reflecting beams radiating to and from said polarization rotating means;

wherein a particular input beam having a first polarization state is diffracted by at least one of said diffractive elements in accordance with a first diffraction efficiency that depends on said first polarization state, passed through said polarization rotating means and rotated into a second polarization state, and diffracted by at least one of said diffractive elements in accordance with a second diffraction efficiency that depends on said second polarization state, whereby the device provides a total diffraction efficiency that is substantially insensitive to the polarization state of said input beam.

13. A device as recited in claim 12 wherein said polarization rotating means provides for rotating the plane of polarization of a beam passing once therethrough by approximately 90 degrees.

14. A device as recited in claim 12 wherein said polarization rotating means comprises a single optical active crystal.

15. A device as recited in claim 14 wherein said single optical active crystal comprises crystal quartz.

16. A device as recited in claim 12 wherein said device comprises means forming a chamber having a first wall at least a portion of which is polished to provide said first reflective surface, and a second wall having a planar surface at least a portion of which is polished to provide said second reflective surface.

17. An optical multiplexing and demultiplexing device comprising:

first and second fiber mounting assemblies, said first fiber mounting assembly for securing a single optical fiber terminating in a fiber end, said second fiber mounting assembly for securing an array of secondary optical fibers each terminating in a fiber end;

first and second transmissive diffractive elements for diffracting optical beams passing therethrough, each said diffractive element having an associated diffraction efficiency that depends on the polarization state of a light beam passing therethrough;

polarization rotating means disposed between said first and second diffractive elements for rotating the polarization plane orientation of a light beam passing through said rotating means; and a first lens and a second lens, said first lens for focusing and collimating beams propagating between the end of said single fiber and said first diffractive element, said second lens for focusing and collimating beams propagating between the ends of said array of optical fibers and said second diffractive element;

wherein in a demultiplexing mode a particular input beam having a first polarization state is transmissively diffracted a first time by said first diffractive element in accordance with a first diffraction efficiency that depends on said first polarization state, passed through said polarization rotating means and thereby rotated into a second polarization state, transmissively diffracted a second time by said second diffractive element in accordance with a second diffraction efficiency that depends on said second polarization state, and focused by said second lens.

18. A device as recited in claim 17 wherein each of said first and second transmissive diffractive elements includes a pair of opposing planar surfaces, the device further comprising first and second optical wedges formed by glass prisms each having a pair of planar surfaces, wherein said polarization rotating means is formed by a crystal having a pair of opposing planar surfaces, and wherein selected ones of the planar surfaces of said first and second diffractive elements, said first and second optical wedges, and said polarization rotating means are contiguous so that said first and second diffractive elements, said first and second optical wedges, and said polarization rotating means form an integral unit.

* * * * *